April 18, 1933.  H. SCHIMMEL  1,904,802
APPARATUS FOR MACHINING ROLLS FOR ROLLING MILLS AND THE LIKE
Filed Dec. 5, 1931   3 Sheets-Sheet 1
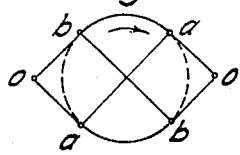
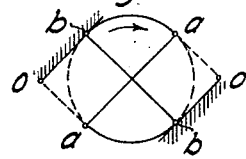
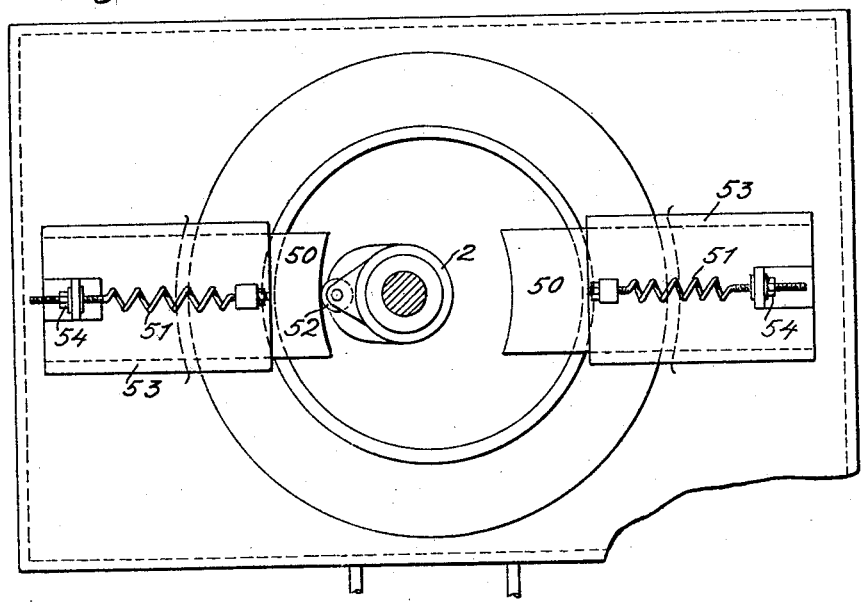
INVENTOR
HANS SCHIMMEL
BY HIS ATTORNEYS April 18, 1933. H. SCHIMMEL 1,904,802
APPARATUS FOR MACHINING ROLLS FOR ROLLING MILLS AND THE LIKE
Filed Dec. 5, 1931   3 Sheets-Sheet 2
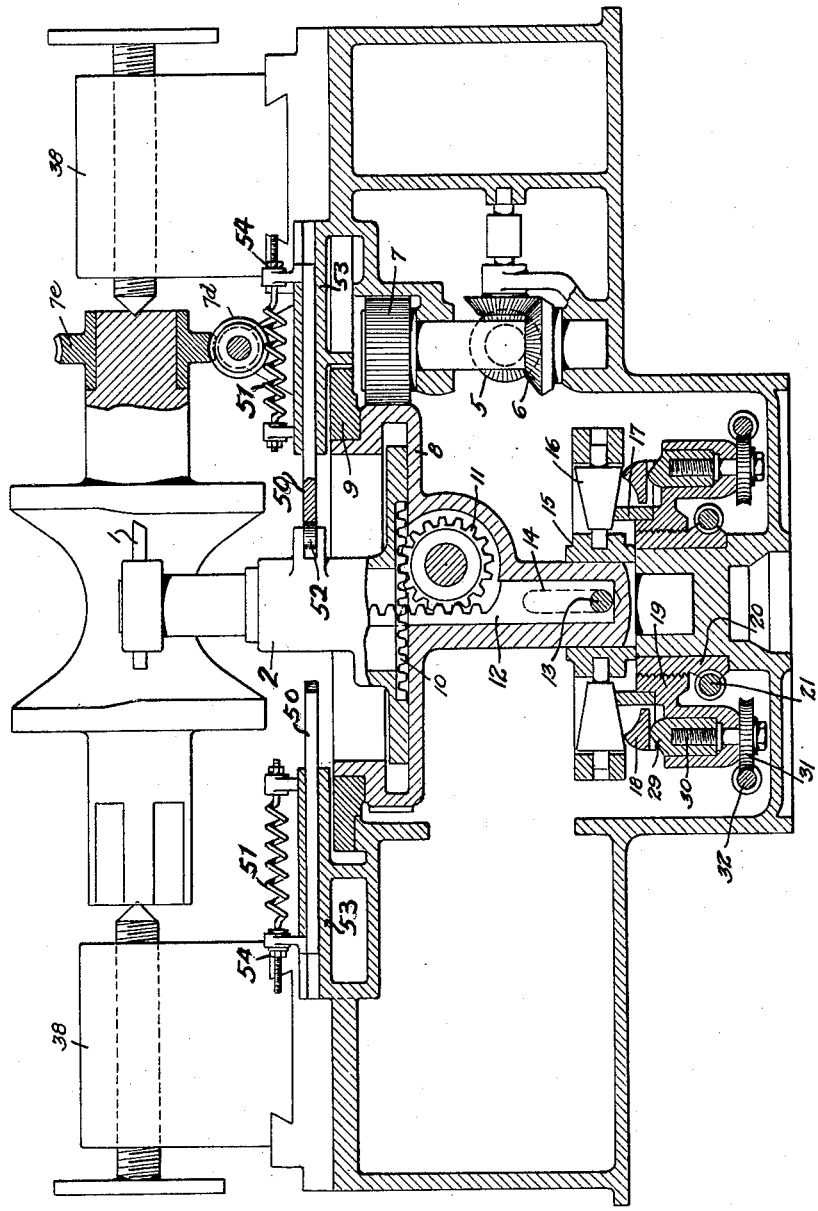
INVENTOR
HANS SCHIMMEL
by his attorneys April 18, 1933.  H. SCHIMMEL  1,904,802
APPARATUS FOR MACHINING ROLLS FOR ROLLING MILLS AND THE LIKE
Filed Dec. 5, 1931   3 Sheets-Sheet 3
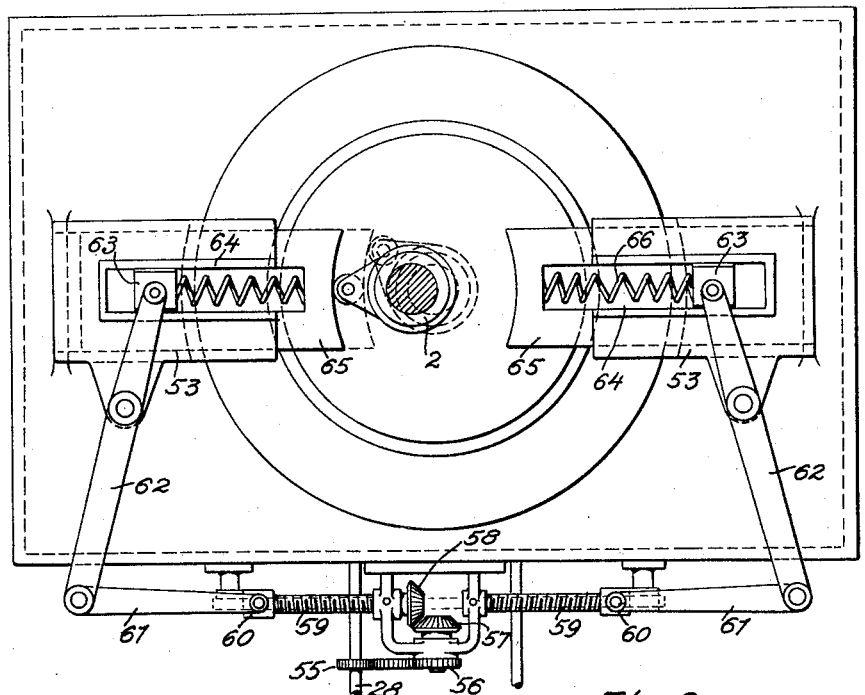
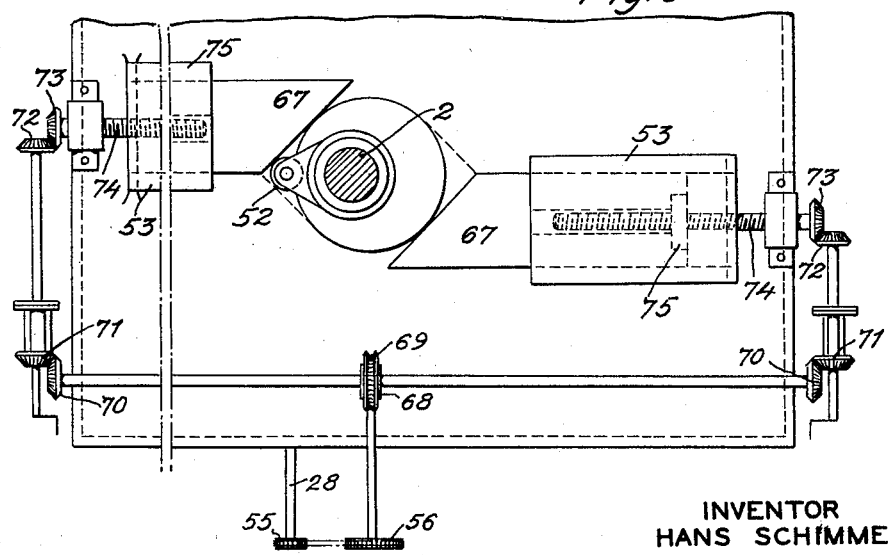
INVENTOR
HANS SCHIMMEL
BY HIS ATTORNEYS
Howson and Howson Patented Apr. 18, 1933

1,904,802

UNITED STATES PATENT OFFICE

HANS SCHIMMEL, OF KOMOTAU, CZECHOSLOVAKIA

APPARATUS FOR MACHINING ROLLS FOR ROLLING MILLS AND THE LIKE

Application filed December 5, 1931, Serial No. 579,277, and in Germany December 24, 1930.

This invention relates to an improvement in or a modification of the apparatus for machining rolls for rolling mills and the like.

My older specification No. 514620 describes apparatus for machining circumferential grooves in Pilger and like rolls in which a tool holder is arranged to extend between a pair of rolls mounted on the machine and is subjected to periodical radial displacement as the tool holder rotates whilst effecting cuts across the peripheral faces of the rolls. The radial displacements of the tool holder are arranged to effect, in conjunction with the rotational movement thereof, a cutting of the inclined side portions of the grooves in the rolls.

The movement of the tool holder from the purely circular movement, during which the bottom of the groove is cut, through a path corresponding to the ensuing outward cut along the inclined side of the groove is positively controlled, whereas the movement of the tool holder corresponding to an inward cut along an inclined portion of the side of the groove until the movement of the tool holder becomes purely rotational is effected by a yielding control, such as a spring or the like, which is arranged to maintain guide rollers, operatively connected to the tool holder, in contact with control cams.

According to this invention the inward movement of the tool holder during the cutting of the inclined portions of the peripheral groove in a roll is effected by means of one or more cams.

The cams may be arranged to effect a positive control of the tool holder or the control may be of a yielding nature.

In order that the invention may be fully understood, reference is directed to the accompanying drawings, in which Figure 1 is a diagram illustrating the paths of movement of a tool in a tool holder in the former apparatus with my older specification, Figure 2 is a diagram similar to Figure 1 but illustrating in a manner hereinafter described, the operation of the apparatus constructed in accordance with this invention, Figure 3 illustrates in sectional elevation an apparatus constructed in accordance with this invention, Figure 4 is a sectional plan of the apparatus illustrated in Figure 3, Figure 5 is a view similar to Figure 4 illustrating a modification of the invention, and Figure 6 is a view similar to Figure 5 but illustrating a further modification of the invention.

Referring to Figure 1, the lines $o\ b\ a\ o$ represent diagrammatically the paths of movement of a tool in a tool holder during one complete rotation thereof in accordance with the apparatus described in my older specification and in which, during the movement of the tool along the lines $a, o$, the tool holder is positively controlled by means of guide rollers operatively connected thereto co-acting with control cams. During the movements of the tool along the lines $o\ b$, the aforesaid rollers operatively connected to the tool holder are maintained in contact with the control cams by a yielding control such, for example, as a tension spring located inside the machine.

Such springs have necessarily to be capable of a comparatively great amount of extension as the force of the springs has to be exerted upon the tool holder in any position thereof and as the tool holder has a considerable range of adjustment corresponding to relatively large effective cutting radii of the tool and to relatively small radii, the effectiveness of the spring is clearly much greater in some positions of the tool holder than in others.

In accordance with this invention the tool holder is positively moved during the travel of the tool corresponding to the lines $o\ b$ of Figure 2. This is preferably effected by the provision of a roller on the tool holder arranged to co-operate with cams which may be rigidly mounted or arranged under the influence of relatively short stiff springs. The point during the rotation of the tool holder, at which the roller contacts with each cam, varies in accordance with whether rigid or yieldingly mounted cams are employed.

When rigidly mounted cams are employed, the roller on the tool holder is arranged to contact with the cam at the point when the tool reaches the point $o$ in Figure 2 and the cam is arranged to force the tool holder inwardly in a radial direction as it rotates during the travel of the tool from $o$ to $b$, whereafter the movements of the tool holder are of a purely rotational nature until the tool reaches the point $a$.

When yieldingly mounted cams are employed, the roller on the tool holder is arranged to contact with the cam at a point during its rotation when the tool reaches the point $a$ in Figure 2, and, as the tool travels from $a$ to $o$ forces the cam against a yielding control, whereafter the cam under the influence of the yielding control forces the tool holder inwardly in a radial direction so that the tool follows the path corresponding to $o\ b$.

In this construction the yielding control of the cam is stressed a predetermined amount during the travel of the tool from $a$ to $o$ and this stress is relieved during the travel of the tool form $o$ to $b$.

In both the above described constructions adjusting devices are provided so that the operation of the cams may be brought into accordance with variations of the effective cutting radius of the tool mounted in the tool holder. These adjusting devices may be arranged to be actuated either by hand or automatically during the operation of the machine. When the adjustment of the cam is arranged to be automatic, the necessary adjustment is effected through the medium of bevel wheels, worms, screw threaded spindles or other gearing operatively connecting the cams with the mechanism arranged to effect adjustment of the cutting radius of the tool in the tool holder.

Referring to Figure 3, a tool 1 is secured in a tool holder 2 which is arranged to be rotated by means of bevel wheels 5 and 6 and gear wheel 7 arranged in mesh with a ring of teeth provided upon the exterior of the upper portion of a rotatable arbour 8 arranged to carry the tool holder 2. The said tool holder is mounted in the enlarged upper portion of the arbour 8 so as to be movable relatively thereto in a radial direction of the said arbour.

The upper portion of the arbour 8 is rotatably mounted in a fixed housing 9. The radial movement of the tool holder 2 is effected during the rotary movements of the arbour 8 by mechanism illustrated in Figure 3, which is located interiorly of the said arbour. The said mechanism consists of a horizontally disposed toothed rack 10 secured to the tool holder 2, a toothed wheel 11 arranged in mesh therewith and with a further toothed rack 12 constituting a driving rod for the said mechanism.

The actuation of the rack 12 is effected by means of rising and falling movements of a pin 13 secured to the said rack and the ends of which extend through diametrically opposed slots 14 formed in the arbour 8, the said ends being secured to a cage 15 arranged to surround the said arbour. The cage 15 is slidably arranged on the arbour 8 and is arranged to be moved vertically under the control of means hereinafter described, arranged to act upon two rollers 16 mounted in the said cage.

The pin 13 in addition to transmitting the rising and falling movements of the cage 15 to the rack 12, is arranged to transmit rotary motion from the arbour 8 to the cage 15, but if desired, a coupling, other than the pin 13, may be arranged between the arbour 8, and the cage 15, so that the correct rising and falling movements of the cage relative to the arbour are not disturbed by a binding action of the pin 13 in the slots 14.

The holder 19 is provided with an internal screw thread arranged in engagement with a corresponding screw thread formed externally upon an upward extension of a worm wheel 20 rotatably mounted upon a bearing provided on the casing of the mechanism and arranged in mesh with a worm 21. Rising and falling movements of the holder 19 are effected by rotation of the worm wheel 20 by means of the worm 21.

The sleeves 29 are each provided with an internally screw threaded hole with which a correspondingly screw threaded spindle 30 is arranged in engagement.

Each spindle 30 is rotatably mounted in a bearing formed in the holder 19 and is arranged to extend below the said holder and is provided with a worm wheel 31 keyed thereto. A worm 32 is arranged in mesh with each of the worm wheels 31.

The roll or rolls to be machined are supported on headstocks 38, movable perpendicularly to their axis corresponding to the different diameters of the rolls to be worked. For each roll, a worm 7$d$ meshes with a worm wheel 7$e$ placed on the roll pin, and gives the roll a feeding movement.

Referring to Figures 3 and 4, an apparatus is illustrated constructed in accordance with my older application which a roller 52 is mounted upon a tool holder 2 which is arranged to be rotated and moved in radial directions. The roller is arranged, during the rotation of the tool holder 2, to engage alternately with each of a pair of cams 50 slidably mounted in guides 53 provided on the machine frame so that the cams 50 are pressed in an inward radial direction towards the tool holder against the influence of springs 51 each of which is connected at one end to the corresponding guide 53 and at the other end to a lug provided on the corresponding cam 50. The tension of each spring 51 may be varied by means of an adjusting nut 54 and the movement of each cam 50, under the influence of the spring 51, is limited by the lug on the cam abutting against the guide 53.

It will be appreciated that with the construction described, rotation of the tool holder causes the roller 52 to deflect each cam 50 in turn against the influence of the corresponding spring 51 until a maximum degree of tension is produced in the spring, for example as is produced with the parts in the position illustrated in Figure 4, whereafter continued rotation of the tool holder causes the pressure of the spring 51 to be applied to the tool holder so that the same is moved in an inward radial direction as it rotates and the rollers operatively connected to the tool holder and arranged within the machine frame are maintained in contact with the cams which positively control the outward radial movements of the tool holder.

Referring to Figure 5, a modified construction of apparatus is illustrated in which 28 denotes a spindle illustrated in the drawings of the older specification which is operable to control radial movements of the tool holder to vary the effective cutting radius of the tool therein. In the present construction, the spindle 28 is connected by a chain of gears 55,56 and bevel wheels 57,58 to a pair of oppositely disposed screw threaded spindles 59. A nut 60 is screwed on to each of the spindles 59 and is connected by a link 61 to one end of a double armed lever 62 pivotally mounted upon the machine frame. The other end of each lever 62 is connected to a slide block 63 slidably mounted in a guide slot 64 provided in a guide 53 for a cam 65, a spring 66 being located between the slide block 63 and the cam 65. The cams 65 are deflected by the roller on the tool holder 2 in a similar manner to that described in connection with the apparatus illustrated in Figures 3 and 4 but it will be appreciated that the tension of the springs 66 is varied in accordance with the radial position of the tool holder as it is moved by rotation of the spindle 28 to effect variations in the effective cutting radius in the tool therein.

Referring to Figure 6 a modification of the invention is illustrated in which the movements of the tool holder, during the travel of the tool corresponding to the line o b in Figure 2 is effected positively. In this construction each of a pair of cams 67 is mounted in a guide 53 and is provided with a nut 75 arranged in engagement with a screw threaded spindle 74 mounted in bearings on the machine frame. Each spindle is operatively connected through the medium of bevel wheels 73,72,71 70, worm wheel mechanism 68,69 and chain wheels 56,55 to the spindle 28 described above with reference to Figure 5. With this construction rotation of the spindle 28 to effect a radial displacement of the tool holder 2 so as to vary the effective cutting radius of the tool therein, also effects displacement of the cams 67, the arrangement being such that the operative faces of the cams always effect a movement of the tool in the tool holder 2 which is tangential to the purely circular movement thereof at any particular radial setting of the tool holder.

In the constructions of Figures 5 and 6 a hand wheel 56ª is provided on the spindle 56ᵇ of the wheel 56ª for to move the cams 65 or 67 relatively to the tool holder manually.

I claim:

1. In an apparatus for machining circumferential portions of rolls of the type described, the combination of means for supporting at least one roll to be machined, a tool holder rotatable about an axis disposed transversely to the axis of a roll so supported, a tool in said holder and which continuously carries out a working movement, mechanism for moving said tool holder positively in an outward radial direction relatively to the axis of rotation thereof as the same rotates and at least one cam operable to move said tool holder in an inward radial direction relatively to said axis for the purpose described.

2. In an apparatus for machining circumferential portions of rolls of the type described, the combination of means for supporting at least one roll to be machined, a tool holder rotatable about an axis disposed transversely to the axis of a roll so supported, mechanism for moving said tool holder positively in an outward radial direction relatively to the axis of rotation thereof as the same rotates and at least one yieldingly controlled cam operable to move said tool holder in an inward radial direction relatively to said axis for the purpose described.

3. In an apparatus for machining circumferential portions of rolls of the type described, the combination of means for supporting at least one roll to be machined, a tool holder rotatable about an axis disposed transversely to the axis of a roll so supported, a tool in said holder and which continuously carries out a working movement, mechanism for moving said tool holder positively in an outward radial direction relatively to the axis of rotation thereof as the same rotates and at least one cam operable to move said tool holder positively in an inward radial direction relatively to said axis for the purpose described.

4. In an apparatus for machining circumferential portions of rolls of the type described, the combination of means for supporting a pair of rolls to be machined with their axes disposed parallel to one another, a tool holder located between a pair of rolls so supported, means for rotating said tool holder about an axis disposed transversely to the axis of said rolls, means for moving said tool holder positively in an outward radial direction with respect to the axis of rotation thereof as the same rotates and at least a pair of yieldingly controlled cams operable to move said tool holder in inward radial directions with respect to said axis as the tool holder rotates.

5. In an apparatus for machining the circumferential portions of rolls of the type described, the combination of means for supporting a pair of rolls to be machined with their axes disposed parallel to one another, a tool holder located between a pair of rolls so supported, means for rotating said tool holder about an axis disposed transversely to the axes of said rolls, means for moving said tool holder positively in an outward radial direction with respect to the axis of rotation thereof as the same rotates and at least a pair of cams operable to move said tool holder positively in inward radial directions with respect to said axis as the tool holder rotates.

6. In an apparatus for machining the circumferential portions of rolls of the type described the combination of means for supporting at least one roll to be machined, an arbour rotatably mounted about an axis disposed transversely to the axis of a roll supported by said means, means for rotating said arbour, a tool holder operatively connected to said arbour so as to rotate therewith and movable radially thereon with respect to the axis of rotation of said arbour, means for positively moving said tool holder in an outward radial direction as the same rotates, and at least one cam operable to move said tool holder in an inward radial direction as the same rotates.

7. In an apparatus for machining the circumferential portions of rolls of the type described, the combination of means for supporting at least one roll to be machined, a hollow arbour rotatable about an axis disposed transversely to the axis of a roll supported by said means, means for rotating said arbour, a tool holder operatively connected to said arbour so as to rotate therewith and movable radially thereon with respect to the axis of rotation of said arbour, mechanism disposed within said arbour for moving said tool holder radially of said arbour and an operative connection between said mechanism and controlling means arranged exteriorly of said arbour arranged to effect positive outward radial movements of said tool holder as the same rotates, and at least one cam operable to move said tool holder in an inward radial direction with respect to said arbour for the purpose described.

8. In an apparatus for machining the circumferential portions of rolls of the type described, the combination of means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed axially in said arbour and an operative connection between the ends of said pin and mechanism arranged exteriorly of said arbour adapted to effect positive outward radial movements of said tool holder as the same rotates, and at least one cam operable to move said tool holder in an inward radial direction of said arbour.

9. In an apparatus for machining the circumferential portions of rolls of the type described, the combination of means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed axially in said arbour, a cage arranged around said arbour and slidable axially thereon, means for rotating said cage with said arbour, an operative connection between said pin and said cage, at least one cam arranged to control said cage as the same rotates to move the same axially with respect to said arbour and thereby effect positive outward radial movement of said tool holder as the same rotates, and at least one supplementary cam operable to move said tool holder in an inward radial direction relatively to said arbour for the purpose described.

10. In an apparatus for machining the circumferential portions of rolls of the type described, the combination of means for supporting at least one roll to be machined, a hollow arbour rotatably mounted about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed therein, a cage surrounding said arbour and slidable axially thereon, means for rotating said cage with said arbour, an operative connection between said pin and said cage, a ring member arranged to surround said arbour and at least a pair of cams diametrically disposed with respect to said arbour, said ring and said cams being operable to engage with said cage and to effect positive movement thereof in one direction axially of said arbour as the same rotates and thereby effect outward radial movement of said tool holder as the same rotates and at least one pair of supplementary cams operable to move said tool holder in an inward radial direction and maintain said carriage in engagement with said first pair of cams.

11. In an apparatus for machining the circumferential portions of rolls of the type described, the combination of means for supporting at least one roll to be machined, a hollow arbour rotatably mounted about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed therein, a cage surrounding said arbour and slidable axially thereon, means for rotating said cage with said arbour, an operative connection between said pin and said cage, a ring member arranged to surround said arbour and at least a pair of cams diametrically disposed with respect to said arbour, said ring and said cams being operable to engage with said cage and to effect positive movement thereof in one direction axially of said arbour as the same rotates and thereby effect outward radial movement of said tool holder as the same rotates and at least one pair of yieldingly controlled supplementary cams operable to move said tool holder in an inward radial direction and maintain said carriage in engagement with said first pair of cams.

12. In an apparatus for machining the circumferential portions of rolls of the type described, the combination of means for supporting at least one roll to be machined, a hollow arbour rotatably mounted about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed therein, a cage surrounding said arbour and slidable axially thereon, means for rotating said cage with said arbour, an operative connection between said pin and said cage, a ring member arranged to surround said arbour and at least a pair of cams diametrically disposed with respect to said arbour, said ring and said cams being operable to engage with said cage and to effect positive movement thereof in one direction axially of said arbour as the same rotates and thereby effect outward radial movement of said tool holder as the same rotates and at least one pair of supplementary cams operable to move said tool holder positively in an inward radial direction, and maintain said carriage in engagement with said first pair of cams.

13. In an apparatus for machining the circumferential portions of rolls of the type described, the combination of means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, an operative connection between said second rack and a cage surrounding said arbour and slidable thereon, means for rotating said cage with said arbour, a ring member arranged to surround said arbour and at least a pair of cams diametrically disposed with respect to said arbour, said ring and said cams being operable to engage with said cage and effect positive movement thereof in one direction axially of said arbour as the same rotates, at least a pair of supplementary cams operable to engage said tool holder and move the same in an inward radial direction of said arbour as the same rotates and to effect movement of said cage in the other axial direction, means operatively connected to said ring and means operatively connected to said first pair of cams for moving said ring and said cams relatively to said arbour in an axial direction thereof and means operatively connected to said supplementary cams for moving the same relatively to said tool holder for the purpose described.

14. In an apparatus for machining the circumferential portions of rolls of the type described the combination of means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed axially therein, a cage arranged exteriorly of said arbour and movable axially thereof, means for rotating said cage with said arbour, an operative connection between said pin and said cage, a ring member arranged to surround said arbour and at least a pair of cams diametrically disposed with respect to said arbour, said ring and said cams being operable to engage with said cage and effect positive movement thereof in one direction axially of said arbour as the same rotates, at least a pair of supplementary cams operable to engage said tool holder and move the same in an inward radial direction of said arbour as the same rotates and to effect movement of said cage in the other axial direction, a non-rotatable support for the said ring and said first pair of cams, a screw threaded bore in said support arranged to engage with a correspondingly screw threaded sleeve axially aligned with said arbour and maintained against axial displacement, gear mechanism for rotating said sleeve and means operatively connected to said supplementary cams and said gear mechanism for moving said supplementary cams relatively to said tool holder for the purpose described.

15. In an apparatus for machining the circumferential portions of rolls of the type described the combination of means for supporting at least one roll to be machined, a hollow arbour rotatable about an axis disposed transversely to the axis of a roll supported by said means, means for rotating said arbour, a tool holder operatively connected to said arbour so as to rotate therewith, and slidable in guides thereon radially with respect to the axis of rotation of said arbour, a rack on said tool holder disposed transversely to the axis of said arbour arranged in mesh with a gear wheel rotatably mounted in said arbour, a second rack disposed axially of said arbour and arranged in mesh with said gear wheel, an operative connection between said second rack and a cage arranged exteriorly of said arbour and movable axially thereof, means for rotating said cage with said arbour, a ring member arranged to surround said arbour and carried by a supporting member, at least a pair of segmental cams diametrically disposed with respect to said arbour and pivotally mounted at their ends to said ring supporting member, means for rocking said cams about their pivots in the axial direction of said arbour, said ring and said cams being operable to engage with said cage and effect positive movement thereof in one direction axially of said arbour as the same rotates, at least a pair of supplementary cams operable to engage said tool holder and move the same in an inward radial direction of said arbour as the same rotates and to effect movement of said cage in the other axial direction and maintain the same in engagement with said segmental cams, a screw threaded bore in said ring supporting member arranged in engagement with a corresponding screw threaded sleeve maintained against axial displacement, gear mechanism for rotating said sleeve and means operatively connected to said supplementary cams and to said gear mechanism operable to move said supplementary cams relatively to said tool holder for the purpose described.

16. In an apparatus for machining the circumferential portions of rolls of the type described, the combination of means for supporting at least one roll to be machined, a tool holder rotatable about an axis disposed transversely to the axis of a roll so supported, mechanism for moving said tool holder positively in one radial direction relatively to the axis of rotation thereof and as the same rotates, at least one yieldingly controlled cam operable to move said tool holder in the opposite radial direction relatively to said axis and mechanism operatively connected to said cam operable to move the same relatively to said tool holder for the purpose described.

17. In an apparatus for machining the circumferential portions of rolls of the type described, the combination of means for supporting at least one roll to be machined, a tool holder rotatable about an axis disposed transversely to the axis of a roll so supported, mechanism for moving said tool holder positively in one radial direction to the axis of rotation thereof and as the same rotates, at least one cam operable to move said tool holder positively in the opposite radial direction relatively to said axis and mechanism operatively connected to said cam operable to move the same relatively to said tool holder for the purpose described.

18. In an apparatus for machining the circumferential portions of rolls of the type described, the combination of means for supporting a pair of rolls to be machined with their axes disposed parallel to one another, a tool holder located between a pair of rolls so supported, means for rotating said tool holder about an axis disposed transversely to the axis of said rolls, means for moving said tool holder positively in an outward radial direction with respect to the axis of rotation thereof as the same rotates, at least a pair of yieldingly controlled cams operable to move said tool holder in an inward radial direction with respect to said axis as the tool holder rotates and mechanism operatively connected to said cams operable to move said tool holder in an inward radial direction with respect to said axis as the tool holder rotates and mechanism operatively connected to said cams operable to move the same relatively to said tool holder for the purpose described.

19. In an apparatus for machining the circumferential portions of rolls of the type described, the combination of means for supporting a pair of rolls to be machined with their axes disposed parallel to one another, a tool holder located between a pair of rolls so supported, means for rotating said tool holder about an axis disposed transversely to the axis of said rolls, means for moving said tool holder positively in an outward radial direction with respect to the axis of rotation thereof as the same rotates, at least a pair of cams operable to move said tool holder positively in an inward radial direction with respect to said axis as the tool holder rotates and mechanism operatively connected to said cams operable to move the same relatively to said tool holder for the purpose described.

20. In an apparatus for machining the circumferential portions of rolls of the type described, the combination of means for supporting a pair of rolls to be machined with their axes disposed parallel to one another, a tool holder located between a pair of rolls so supported, means for rotating said tool holder about an axis disposed transversely to the axes of said rolls, means operable to move said tool holder positively in an outward radial direction with respect to the axis of rotation thereof as the same rotates, a roller on said tool holder, at least a pair of cams slidably mounted in fixed guides carried by the machine frame and operable under the influence of a yielding control to engage with said roller as the tool holder rotates and move the said holder in an inward radial direction with respect to said axis for the purpose described.

21. In an apparatus for machining the circumferential portions of rolls of the type described, the combination of means for supporting a pair of rolls to be machined with their axes disposed parallel to one another, a tool holder located between a pair of rolls so supported, means for rotating said tool holder about an axis disposed transversely to the axes of said rolls, means operable to move said tool holder positively in an outward radial direction with respect to the axis of rotation thereof as the same rotates, a roller on said tool holder, at least a pair of cams slidably mounted in fixed guides carried by the machine frame and operable to engage with said roller as the tool holder rotates and move the said holder positively in an inward radial direction for the purpose described.

22. In an apparatus for machining the circumferential portions of rolls of the type described, the combination of means for supporting a pair of rolls to be machined with their axes disposed parallel to one another, a tool holder located between a pair of rolls so supported, means for rotating said tool holder about an axis disposed transversely to the axes of said rolls, means operable to move said tool holder positively in an outward radial direction with respect to the axis of rotation thereof as the same rotates, a roller on said tool holder, a least a pair of cams slidably mounted in fixed guides carried by the machine frame and operable under the influence of a yielding control to engage with said roller as the tool holder rotates and move the said holder in an inward direction with respect to the said axis of rotation and mechanism operatively connected to said cams operable to move the same relatively to said tool holder for the purpose described.

23. In an apparatus for machining the circumferential portions of rolls of the type described, the combination of means for supporting a pair of rolls to be machined with their axes disposed parallel to one another, a tool holder located between a pair of rolls so supported, means for rotating said tool holder about an axis disposed transversely to the axis of said rolls, means operable to move said tool holder positively in an outward radial direction with respect to the axis of rotation thereof as the same rotates, a roller on said tool holder, at least a pair of cams slidably mounted in fixed guides and operable to engage with said roller as the tool holder rotates and move the said holder positively in an inward radial direction with respect to said axis of rotation and mechanism operatively connected to said cams operable to move the same relatively to said tool holder for the purpose described.

24. In an apparatus for machining the circumferential portions of rolls of the type described, the combination of means for supporting a pair of rolls to be machined with their axes disposed parallel to one another, a tool holder located between a pair of rolls so supported, means for rotating said tool holder about an axis disposed transversely to the axes of said rolls, means operable to move said tool holder positively in an outward radial direction with respect to the axis of rotation thereof as the same rotates, a roller on said tool holder, at least a pair of cams slidably mounted in fixed guides carried by the machine frame and operable under the influence of a yielding control to engage with said roller as the tool holder rotates and move the said holder in an inward radial direction with respect to said axis of rotation, a pivotally mounted double armed lever for each of said cams operatively connected at one end thereto through the medium of said yielding control and at the other end to a feed screw mechanism operable automatically to move said lever and said cam relatively to said tool holder for the purpose described.

25. In an apparatus for machining the circumferential portions of rolls of the type described, the combination of means for supporting a pair of rolls to be machined with their axes disposed parallel to one another, a tool holder located between a pair of rolls so supported, means for rotating said tool holder about an axis disposed transversely to the axes of said rolls, means operable to move said tool holder positively in an outward radial direction with respect to the axis of rotation thereof as the same rotates, a roller on said tool holder, at least a pair of cams slidably mounted in fixed guides carried by the machine frame and operable to engage with said roller as the tool holder rotates and move the said holder positively in an inward radial direction with respect to said axis of rotation, a feed screw operatively connected to each of said cams and operable automatically to move the same relatively to the tool holder for the purpose described.

26. In an apparatus for machining the circumferential portions of rolls of the type described the combination of two pairs of headstocks each arranged to support a roll to be machined with the axes of the said rolls disposed parallel to one another, feed mechanism operatively connected to said headstocks and adapted to move each pair of head-stocks towards and away from the other pair in a direction transverse to the axis of a roll supported thereby, a tool holder disposed between a pair of rolls supported by said head-stocks, means for rotating said tool holder about an axis disposed transversely to the plane extending through the axes of said rolls, means operable to move said tool holder positively in an outward radial direction with respect to the axis of rotation thereof as the same rotates and at least a pair of cams operable to move said tool holder in an inward radial direction relatively to said axis as the tool holder rotates for the purpose described.

In testimony whereof I have signed my name to this specification.

HANS SCHIMMEL.